June 23, 1936.  D. KASEN  2,045,471
METHOD OF PRODUCING MOLDED ARTICLES FROM CASEIN
Filed April 24, 1936
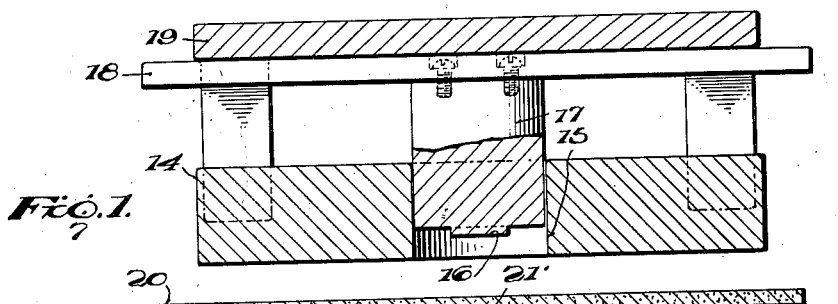
Fig.1.
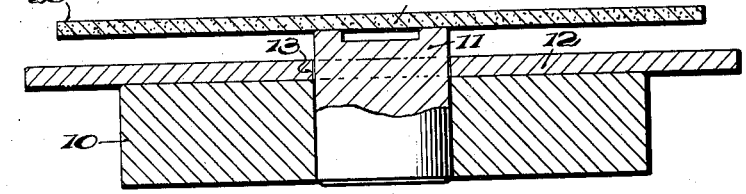
Fig.2.
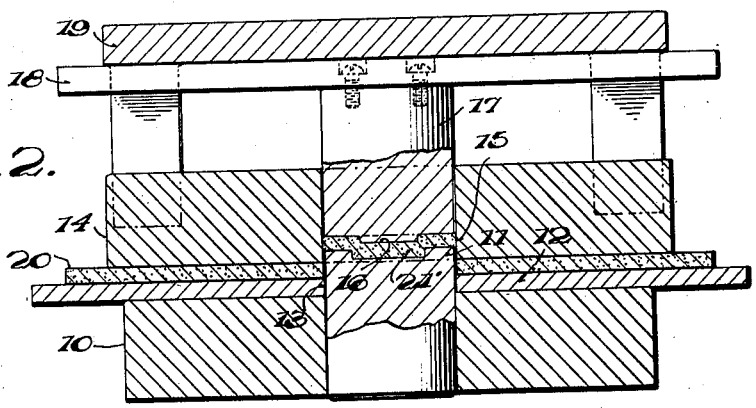
Fig.3.
Fig.4.
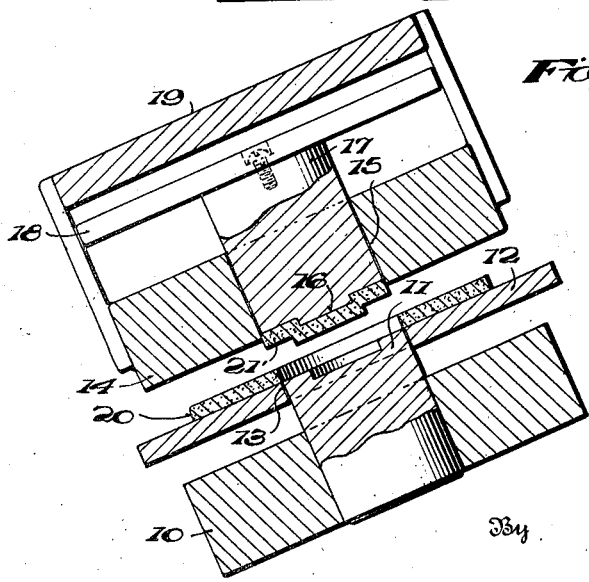
Inventor
Daniel Kasen
By
Attorney Patented June 23, 1936

2,045,471

UNITED STATES PATENT OFFICE 2,045,471

METHOD OF PRODUCING MOLDED ARTICLES FROM CASEIN

Daniel Kasen, Newark, N. J., assignor of one-half to Louis A. Kasen, Newark, N. J.

Application April 24, 1936, Serial No. 76,283

17 Claims. (Cl. 18—47.5)

My invention relates to a method of molding uncured plastic casein.

The present application is a continuation in part of my pending application for Method of producing molded articles from casein, filed October 30, 1935, Serial Number 47,492.

Casein is obtained upon the market, in a powdered form, for use in the plastic industry. This powder is subjected to the action of water, plasticizing agents, heat and pressure, to form a plastic mass. Sometimes the casein is plasticized in a heated tubing machine and is extruded in the form of rods or tubes. If it is desired to make the material into sheets, instead of rods or tubes, these rods or tubes, at atmospheric temperature, are placed in a mold which is heated to about 140° F. to 200° F. and pressure from about 500 to 2,000 pounds per square inch is applied to the rods or tubes, which renders the material plastic and produces a homogeneous sheet. The mold is then chilled and the sheet removed. This removed sheet may be cured in the well known manner by being subjected to the action of formaldehyde and subsequently washed to remove the excess formaldehyde and dried in the customary manner, and may then be placed upon the market in the sheet form. Before curing, the sheet, at atmospheric temperature, may be cut or punched into articles of desired shapes or sizes, and these articles may then be subjected to the curing step, or the sheet, at atmospheric temperature, may be cut into blanks, and these blanks introduced into a heated mold and subjected to pressure while heated, for producing articles of desired shapes, which articles after being removed from the mold, are subjected to the curing step. Instead of converting the uncured extruded rods or tubes into a sheet, such uncured rods or tubes, at atmospheric temperature, may be cut into slugs and these slugs introduced into a hot mold, and while heated, the slugs are subjected to the action of pressure within the mold, to produce the molded articles. In any event, the heated mold and article must be allowed to cool to substantially atmospheric temperature, so that the molded article may be properly separated from the mold, without liability of injury or destruction. By the use of the heated mold, several disadvantages are encountered. The mold must be heated, and time must be allowed for the mold and molded article to cool to substantially atmospheric temperature, before the article can be removed. Furthermore, a mold designed to be heated is more complicated and expensive, and there is the added cost of heating the mold, and the time cycle of heating and cooling the mold of from 3 to 5 minutes. As far as I am aware, in the molding of the casein, the same has been heated by introducing the same into a heated member, such as a tubing machine, or mold. The foregoing is the practice old in the art.

I have discovered that great economy may be effected in the making of molded articles from casein material before it is cured, by first heating the casein material, so that it is rendered moldable, and then introducing this heated uncured plastic casein material into a cool mold, as substantially atmospheric temperature, and then immediately subjecting the casein material therein, to pressure, so that the desired article is molded. The uncured casein material, which may be extruded or unextruded, has a water content of from 20% to 50%, and it is necessary that such casein material have this water content, in order that it may be molded in a cool mold. The molded article remains in the cool mold until its temperature has been lowered sufficiently so that the article has hardened and may be removed from the mold, and after removal, the article is cured, including treating the same with formaldehyde, washing to remove excess formaldehyde, and drying in the ordinary manner.

In the accompanying drawing forming a part of this application, and in which like numerals are employed to designate like parts throughout the same, Figure 1 is a side elevation of molding apparatus used in the practice of the method, the mold member being in the open position, Figure 2 is a similar view with the mold members in the closed position, Figure 3 is an edge elevation of the same, and, Figure 4 is a plan view of the article.

The apparatus which may be employed in the practice of the method, embodies a stationary male member 10, carrying a die 11, and a stripper 12 is arranged upon the male member 10 and has an opening 13 for the passage of the die 11. The numeral 14 designates a coacting female member, having a recess or cavity 15, the bottom of which is formed by the end 16 of an ejector 17, also slidable within the recess 15. A bar 18 is rigidly attached to the ejector 17, and the outward movement of the bar is positively limited by a stop 19, rigidly attached to the movable member 14.

In the practice of the method, a sheet 20 of heated uncured plastic casein material having a water content of from 20% to 50% may be employed, and this uncured sheet may be produced as described and as is well known in the art. This uncured sheet of casein material is preferably placed between hot plates and heated to a temperature of about 140° F. to 200° F. so that it is rendered moldable, and this heated sheet is placed between the open members 14 and 10, and the member 14 moved toward the stationary member 10, until the closed position is reached. When this is done, the die 11 cuts a blank 21 from the sheet 20, and this hot blank is forced into the recess 15. This blank 21 has a temperature of from 140° F. to 200° F. As soon as the blank enters the recess it is acted upon by the end of the die 11 and the end of the ejector 17, now retracted, and is subjected thereby to a pressure of about 200 to 1,000 pounds per square inch. The pressure is immediately applied to the hot moldable blank 21, for the same must be quickly molded into the desired shape, as the walls of the mold are cool or at atmospheric temperature, members 10 and 14, die 11, and ejector 17 and associated elements all being cool or at atmospheric temperature. As shown in the drawing, the stationary die 11 enters the cavity or recess 15, when the female mold member 14 moves downwardly to apply the pressure, by the die 17. This die 11, therefore closes the bottom of the cavity or recess 15 and rigidly supports the casein material against the pressure. The pressure is applied in an increasing manner until the maximum desired pressure is obtained. The movable member 14 may remain closed while the molded article is cooling, and the molded article remains in the cool mold until the mold has absorbed sufficient heat from the article so that the article is rendered solid and may be removed from the mold without liability of distortion or destruction. The time necessary to effect the heat exchange between the molded article and the walls of the mold is usually from 30 to 60 seconds. After the cooling period, the member 14 is moved from the member 10, to the open position, and the ejector 17 moved forwardly to eject the molded article, which falls from between the inclined member 10 and 14, and at about this time, the stripper 12 is moved from the member 10 so that the scrap sheet 20 is removed from the die 11 and from between members 10 and 14, so that the operation may be repeated by the use of another heated sheet 20. After the molded article is thus removed from the mold, it is cured in the usual manner by subjecting the same to the action of formaldehyde and then washing and drying. As above described, the heated blank of the moldable casein material is introduced into a cool mold, and after being molded is cooled by heat transfer between the heated molded article and the mold. I have found that this heat transfer between the molded article and the mold will not perceptibly raise the temperature of the mold, so that the mold may be used continuously in the molding of articles. This is due to the relatively large bulk of the mold with respect to the small bulk of the molded article. However, should there be any tendency for the mold to rise in temperature above substantially atmospheric temperature, I contemplate using any suitable means to cool or regulate the temperature of the mold, such as a water jacket or the like.

I also contemplate treating uncured casein rods or tubes, having a water content of from 20% to 50%, extruded or unextruded, by my method, to finish the same. When this is done, the uncured casein rod or tube is heated to a hot molding temperature and introduced into the cavity of a cool mold, and therein subjected to a molding pressure, whereby the rod or tube is properly shaped and its surface rendered smooth or uniform. The rod or tube is allowed to cool in the mold and is removed when its temperature is substantially at atmospheric temperature, at which time the rod or tube is hard. I also contemplate treating uncured casein sheets, having a water content of from 20% to 50%, extruded or unextruded, in a similar manner, for the same purpose. By the practice of my method, in the treatment of the rods, tubes, or sheets, the ordinary grinding of the same to render their surfaces uniform or accurate is eliminated.

It is preferred to use a sheet of heated extruded casein material, and stamp the blank from the same, while in the mold, and introduce such heated blank into the cool mold cavity, but I contemplate using heated slugs of uncured casein material, which are cut from the extruded rods or tubes, produced as described. I contemplate using uncured plastic casein which is not extruded, but made by any other process. All forms of casein material, whether extruded or unextruded, which I use in the practice of my method have a water content of from 20% to 50%. In the majority of cases I find that good results can be obtained by using casein material, extruded or unextruded, having a water content of from 30% to 40%. Satisfactory results have been obtained by using such casein material having a water content of 40%. However, the water content of the casein material may vary somewhat. If the casein material is thin, the water content should be increased, and if the casein material is heavy or thick, the water content may be lowered. Tests which I have made indicate that the water content of the uncured casein material should not exceed 50%, nor be less than 20%.

I also contemplate extruding the moldable casein material through an elongated slot, of a heated extruding machine, to form the same directly into a sheet. During this extruding action the material will be heated to a temperature of from 140° F. to 200° F. and subjected to a pressure of about 500 pounds per square inch. The extruded sheet may then be reheated so that the hot blank may be stamped therefrom and introduced into the cool mold for forming the molded article. The directly extruded sheet is not subjected to as high a degree of pressure as the sheet formed from the extruded rods because the material is flowing through an orifice and most of the pressure has been absorbed in plasticizing this material so that when it emerges, its pressure has been largely diminished, and is not as dense, and may be more readily molded into the article. This directly extruded uncured casein sheet has a water content of from 20% to 50%.

I also contemplate taking the heated directly extruded sheet, while hot, and stamping the heated blank from the same and introducing it into the mold, which is cool, and then molding the article by pressure, as explained. This would eliminate reheating the sheet. The directly extruded sheet is of course uncured, and the molded article made therefrom is cured in formaldehyde, as is well known, after it has cooled to atmospheric temperature. I contemplate using uncured extruded casein material, and uncured casein material which has not been extruded. Either form of casein material may have a hot blank stamped therefrom while the material is hot, or the material may be allowed to cool and the blank stamped from the cool material and reheated. The casein material thus used may be in the form of a sheet, rod or tube.

In the practice of the method, the casein material may be extruded in the form of tubes or rods which are allowed to cool. These tubes or rods are reheated and subjected to pressure in the mold to produce the sheet, and the sheet is allowed to cool and is removed from the mold. The sheet thus produced has a water content of from 20% to 50% and is reheated and while hot is introduced in the mold and the hot blank cut from the same and forced into the mold cavity, which is cool, and there subjected to the desired pressure. Instead of stamping the blank from the reheated sheet, the blank may be stamped from a cold sheet, and the blank reheated and introduced while hot into the cool mold cavity, and therein subjected to pressure for molding the article. The sheet of casein material may be made from the hot rods or tubes as they pass from the extruding machine, without reheating such rods or tubes. This sheet may be allowed to cool and may be reheated and introduced while hot into the cool mold so that the hot blank may be stamped therefrom and forced into the cool mold cavity. I also contemplate cutting hot slugs from the hot extruded rods or tubes passing from the extruding machine, and introducing these hot slugs into the cool mold cavity, for the action of pressure, or the extruded rod or tubes may be allowed to cool and then reheated so that the hot slugs may be cut therefrom. As before stated, the invention is not restricted to the use of uncured extruded casein material, as uncured plastic casein material which is not extruded may also be employed. In all of these cases, the casein material has a water content of from 20% to 50%. In either event, the heated uncured plastic casein material having a water content of from 20% to 50%, is introduced while hot into the cool mold cavity and therein immediately subjected to pressure to produce the desired article, before the cooling action occurs to render such material solid.

The method contemplates retaining the mold at substantially a uniform cool temperature, and by "cool" is meant atmospheric or room temperature. This room temperature is about 60° F. to 80° F. Satisfactory results are obtainable by having the mold at a cool temperature of substantially 80° F. No advantage would be obtained in having the mold at temperature outside of the limits stated, and the claims are not restricted to these limits of temperature unless they recite the same. The uncured casein material is heated prior to its introduction into the cool mold and is termed "hot casein material". The term "hot" is used to indicate a sufficiently high temperature which will render the casein material plastic for molding purposes. No advantage would be obtained in heating the casein material to temperatures outside of 140° F. to 200° F., and when the term "hot" is used in the claims it does not define a temperature necessarily restricted to 140° F. to 200° F., but is used to define this temperature or other temperatures which will produce the same or satisfactory results. A molding pressure of 200 to 1,000 pounds per square inch is found to be satisfactory, and if the pressure is carried outside of the limits no advantage would result. However, when the term "molding pressure" is used in the claims, it is intended to cover not only a pressure of from 200 to 1000 pounds per square inch, but any pressure which will suitably mold the articles. By the term "curing", in the claims, is meant subjecting the material or article to the action of formaldehyde and then washing to remove the excess formaldehyde and drying. By the term "article" is meant any completed product, such as a button, buckle, ash tray, etc., as well as rods, tubes, or sheets, which may be employed in producing such finished products. By the term "moldable casein material" is meant any uncured casein material, extruded or unextruded, having a water content of from 20% to 50%.

It is to be understood that the forms of my method herewith shown and described are to be taken as preferred examples of the same, and that various changes may be resorted to in the order of the steps of the method, and in the temperature and pressure controls, without departing from the spirit of my invention or the scope of the subjoined claims.

Having thus described my invention, I claim:

1. The method of making articles from casein, comprising heating uncured moldable casein material to a hot temperature, introducing the hot uncured moldable casein material into the cavity of a cool mold, subjecting the moldable casein material while hot and within such cavity to an increasing molding pressure to mold the article, allowing the molded heated article to remain within the cavity for effecting heat exchange so that the article is cooled and rendered substantially solid, removing the cool molded article from within the cavity, and curing the removed article.

2. The method of making articles from casein, comprising introducing hot plastic uncured moldable casein material into a cavity of a cool mold, subjecting the moldable casein material while hot and within the cavity to a molding pressure while rigidly supporting the same against such pressure to mold the article, allowing the molded article to cool and harden, and then curing the hardened article.

3. The method of making articles from casein, comprising introducing hot plastic casein material having a water content of from 30% to 40% into a cavity of a cool mold, subjecting such casein material while hot and within the cavity to an increasing molding pressure to mold the article, allowing the molded article to cool and harden, and then curing the hardened article.

4. The method of making articles from casein, comprising introducing hot uncured plastic casein material having a water content of substantially 40% into a cavity of a cool mold, subjecting such casein material while hot and within the cavity to a molding pressure rigidly supporting the same against such pressure to mold the article, allowing the molded article to cool and harden, and then curing the hardened article.

5. The method of making articles from casein, comprising cutting a hot blank from a hot sheet of uncured plastic casein material having a sufficient water content to render the same moldable in a cool mold, introducing the hot blank into the cavity of a cool mold, subjecting the hot blank within such cavity to a molding pressure to mold the article, allowing the molded article to cool within the cavity, removing the cool molded article from within the cavity, and curing such article.

6. The method of making articles from casein, comprising introducing uncured plastic casein material having a sufficiently high water content to render the same moldable in a cool mold and at a temperature of substantially from 140° F. to 200° F. into the cavity of a cool mold, immediately subjecting such casein material to the action of pressure of from 200 to 1,000 pounds per square inch in the mold cavity, cooling the molded article to substantially atmospheric temperature by heat exchange between the heated article and the cool mold, removing the cooled article, and then curing the same.

7. The method of making articles from casein, comprising introducing hot extruded plastic casein material having a sufficiently high water content to render the same moldable in a cool mold into the cavity of a cool mold, subjecting the casein material while hot and within the cavity to the action of a molding pressure to mold the article while maintaining the mold at an approximately uniform cool temperature, cooling the molded article, removing the molded article from within the cavity, and curing the same.

8. The method of making articles from casein, comprising directly extruding plastic casein material having a water content of from 20% to 50% into a heated sheet and allowing the sheet to cool, reheating the cool sheet having a water content of from 20% to 50% to a hot temperature, stamping a hot blank from the hot sheet and introducing the same into the cavity of a cool mold, immediately subjecting the blank while hot and within the cavity to a molding pressure to mold the article, cooling the heated molded article by heat exchange with the mold, removing the cooled article from the cavity, and curing the same.

9. The method of making articles from casein, comprising directly extruding hot uncured plastic casein material having a sufficiently high water content to render the same moldable in a cool mold into a sheet also having a sufficiently high water content to render the same moldable in a cool mold, stamping a hot blank from the hot sheet and introducing the hot blank into the cavity of a cool mold, subjecting the hot blank within the cavity to a molding pressure to produce the molded article, cooling the molded article by heat exchange with the cool mold, removing the cooled article from within the cavity, and curing the same.

10. In the method of making articles from casein, the steps of introducing hot uncured plastic casein material having a sufficiently high water content to render the same moldable in a cool mold into the cavity of a cool mold, and subjecting the hot casein material within the cavity to an increasing molding pressure to mold the article.

11. In the method of making articles from casein, the steps of extruding hot uncured plastic casein material having a water content of from 20% to 50%, immediately introducing the hot extruded casein material into the cavity of a cool mold, subjecting the hot casein material within the cavity to an increasing molding pressure, and cooling the molded article by heat exchange with the cool mold.

12. The method of molding uncured plastic casein material comprising introducing hot uncured plastic casein material having a water content sufficiently high to permit the same to be molded in a cool mold and while hot into the cavity of a cool mold, subjecting the casein material while hot and within the cavity to an increasing molding pressure to mold the same, allowing the molded casein material to cool and harden, removing the molded material, and then curing the molded casein material.

13. The method of treating an uncured plastic casein material article containing a sufficiently high water content to permit of the same being molded in a cool mold, such as a rod, tube, or sheet, to shape or finish the same, comprising introducing such article while hot into the cavity of a cool mold, subjecting the article while hot and within the cavity to a molding pressure while rigidly supporting the same against such pressure to mold the article, allowing the molded article to cool by heat exchange with the mold and thereby harden, removing the hardened article, and curing the same.

14. The method of making finished articles from casein, comprising introducing hot uncured plastic casein material having a sufficiently high water content to render the same moldable in a cool mold into the cavity of a cool mold, subjecting the hot uncured plastic casein material while within the cavity to the pressure action of a plunger entering the cavity to mold the article and retain all of the casein in the cavity, cooling the molded article by heat exchange with the cool mold, removing the cool molded article, and curing such article.

15. The method of making finished articles from casein, comprising arranging a sheet of hot uncured plastic casein material having a water content sufficiently high to permit of molding in a cool mold between the male and female members of a cool mold, stamping a blank from the hot sheet and inserting the hot blank into the cavity of the female mold member by moving the male mold member into such cavity and subjecting the hot stamped blank while within the cavity to the pressure of the male mold member to mold the article and retain all of the casein material in the cavity, cooling the molded article by heat exchange with the cool mold, removing the cool molded article, and curing such article.

16. The method of making articles from casein, comprising cutting a hot blank from a hot sheet of uncured plastic casein material having a sufficient water content to adapt the same to be shaped in a cool mold and forcing the hot blank into the cavity of a cool mold, subjecting the hot blank within such cavity to pressure applied to one side of the same to shape the article, allowing the shaped article to cool within the cavity, removing the cool shaped article from within the cavity, and curing such article.

17. The method of making relatively small articles from casein, comprising introducing a correspondingly small bulk of hot plastic casein material having a water content of from 20% to 50% into a cavity of a cool mold having a relatively large bulk with respect to the bulk of the hot plastic casein material so that such mold is not substantially heated by the same, subjecting such casein material while hot and within the cavity to a molding pressure to mold the casein article, allowing the molded article to cool and harden, and then curing the hardened article.

DANIEL KASEN.